United States Patent
Armstrong et al.

(10) Patent No.: US 7,137,120 B2
(45) Date of Patent: Nov. 14, 2006

(54) DYNAMIC DIAGNOSTIC PROGRAM FOR DETERMINING THREAD WAIT TIME

(75) Inventors: William Joseph Armstrong, Rochester, MN (US); Ryan Harvey Bishop, Rochester, MN (US); Michael Brian Brutman, Rochester, MN (US); Chris Francois, St. Paul, MN (US); Richard Karl Kirkman, Rochester, MN (US); Jay Paul Kurtz, Rochester, MN (US); Henry Joseph May, Mantorville, MN (US); Naresh Nayar, Rochester, MN (US); Dennis A. Towne, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 10/022,982

(22) Filed: Dec. 17, 2001

(65) Prior Publication Data

US 2003/0114949 A1   Jun. 19, 2003

(51) Int. Cl.
G06F 9/46 (2006.01)
G06F 9/45 (2006.01)
G06F 15/16 (2006.01)
G06F 17/30 (2006.01)
G06F 19/00 (2006.01)

(52) U.S. Cl. .................... 718/107; 717/106; 709/227; 707/8; 707/204; 700/109

(58) Field of Classification Search ........ 718/100–108; 710/260; 717/125, 130, 108, 106; 714/38; 707/8, 204; 700/109; 709/223
See application file for complete search history.

(56) References Cited

U.S. PATENT DOCUMENTS

| 4,183,083 | A | * | 1/1980 | Chatfield ................ 710/260 |
| 5,450,592 | A | * | 9/1995 | McLeod ................. 718/104 |
| 5,706,515 | A | * | 1/1998 | Connelly et al. ........ 718/106 |
| 5,872,909 | A | * | 2/1999 | Wilner et al. ............ 714/38 |
| 5,878,262 | A | * | 3/1999 | Shoumura et al. ...... 717/164 |
| 6,009,269 | A | * | 12/1999 | Burrows et al. ........ 717/130 |
| 6,202,199 | B1 | * | 3/2001 | Wygodny et al. ....... 717/125 |
| 6,314,563 | B1 | * | 11/2001 | Agesen et al. .......... 717/108 |
| 6,622,155 | B1 | * | 9/2003 | Haddon et al. ......... 718/100 |
| 6,816,874 | B1 | * | 11/2004 | Cotner et al. .......... 707/204 |
| 7,051,026 | B1 | * | 5/2006 | Berry et al. .............. 707/8 |
| 2003/0023952 | A1 | * | 1/2003 | Harmon, Jr. ........... 717/106 |
| 2003/0105854 | A1 | * | 6/2003 | Thorsteinsson et al. .. 709/223 |
| 2005/0159835 | A1 | * | 7/2005 | Yamada et al. ........ 700/109 |

OTHER PUBLICATIONS

Lee et al., "Performance Analysis of Distributed Deadlock Detection Algorithms", IEEE, 2001, pp. 623-636.*

* cited by examiner

*Primary Examiner*—Meng-Al T. An
*Assistant Examiner*—Jennifer N. To
(74) *Attorney, Agent, or Firm*—Wood, Herron & Evans, LLP

(57) ABSTRACT

Diagnostic data, such as a time increment corresponding to how long a thread waits to access a shared resource, is stored within a predetermined location in a data structure, such as a hash bucket in a hash table. The location is preferably correlated to the resource such that a display of the diagnostic data may be tailored to reflect a user-specified relationship between the data and resource.

34 Claims, 4 Drawing Sheets

DYNAMIC DIAGNOSTIC PROGRAM FOR DETERMINING THREAD WAIT TIME

FIELD OF THE INVENTION

The present invention relates to computing systems, and more particularly, to evaluating performance of a program within a multithreaded system.

BACKGROUND OF THE INVENTION

The speed and efficiency of many computing applications depend in large part upon the availability of processing resources. To this end, computing architectures commonly incorporate multithreaded processes that enable sharing of resources. Such threading can accommodate multiple paths of execution within a computer/operating system. As such, a thread may be characterized as a separately executable portion of a process. Each thread typically has its own distinct program counter and represents a separate movement of a processor through program instruction space and storage. In this manner, a program may be broken-up into multiple different threads. Ideally, this segmentation avoids requiring a computer process to execute a single unitary process or program from start to finish with pronounced intervals of wasted processing time. As such, a thread continuously accesses a resource until either its execution is interrupted or that thread must wait for a resource it requires to become available.

To facilitate coordination of threads and associated resources, threads typically share a priority scheme or schedule that partially dictates allocation of processing cycles as between different threads. A task dispatcher program may use this scheme to assign and dispatch a central processing unit(s) (CPU), timeslice, or other resource to each thread. Such exemplary resources might include hardware registers, database files and other memory resources. Thus, multi-threaded operation can provide the illusion of simultaneous execution of multiple programs, given the relatively high processing speeds relative to that of other resources in the computer.

However, despite the flexibility afforded by multithreaded systems, complications associated with resource allocation persist. Some such obstacles arise from the dynamic, intertwined processing requirements of operating systems. Namely, while each thread of an operating system may have access to the same resource at one time or another, only one thread can access the resource at a time. This provision is termed "serialization" and can prevent operating errors, such as two threads incrementing a counter out of sequence. Consequently, access to resources for many threads may be premised upon the prior execution of others. Such dependency may introduce its own complexity and inefficiency into a processing application. Compounded over multiple processing layers and iterations, thread inactivity translates into slow processing speeds due to wait periods.

A specific instance of such a wait time may occur where an accessing thread has locked access to a contentious resource to ensure its own exclusive processing. For instance, the thread may initiate a gate lock to prevent the task dispatcher from allowing access to another thread desiring the resource, thus satisfying the above discussed serialization requirement. As such, while one thread updates a resource, hundreds or thousands of others may wait for access. Such a lock may remain in force until a condition is met. Thus, the additional threads remain locked out of the resource by the operating system.

Exemplary conditions may include the thread accomplishing its task or being timed-out. A timed-out condition regards the task dispatcher removing a thread from a resource after the expiration of a predetermined duration. Once execution so ceases for a given thread, the computer system begins executing another thread then cued for execution through context switching.

While delays associated with contact switching may be relatively small as compared to the processing cycles that would otherwise be wasted during single task processing, advantages realized by multithreading have given rise to a demand for even greater efficiencies. To this end, inefficiencies associated with idle threads prompt programmers and network designers to minimize wait periods associated with the above discussed locks and context switching operations. Locating, analyzing and correcting suspected faults/contentious instances of a computer program is a process known as debugging.

One potential remedy for periods of excessive waiting may include shortening a path length to a resource, thereby decreasing associated processing cycles and time. Another solution may involve including multiple instances of a subroutine and/or resource throughout a system, increasing the accessibility of the contentious program function. Where a lock is attributable to a shortage of a hardware resources, the most feasible solution may involve integrating more hardware into the system. The inclusion of additional hardware may reduce the incidence of idle threads, facilitating more efficient utilization of CPU resources.

Implementing such solutions, however, presupposes the identification of contentious locking incidences. Locating a problematic task and/or resource can represent a daunting and painstaking undertaking for a programmer. To this end, debugging operations may utilize programs configured to assist the analysis of system processes. For example, a designer may rely on a task switch trace program to record switching occurrences relating to a particular thread. A task switch trace program creates a comprehensive history of all transition sequences relating to the thread.

Transitions tracked by the task switch trace program may include every incidence of where execution of a thread was halted. The task switch trace program generally responds to each transition occurrence by recording the time of a halting occurrence within a database exclusive to the thread. Due to the exhaustive volume of such occurrences that are typically associated with a single thread, the database populated by the task switch trace program may require substantial storage space. Such storage requirements can severely burden available resources of most systems if used with any frequency.

As such, databases generated by the task switch trace program may only be run for very short periods due to the large amount of data recorded by the program. The selective operation of the program further handicaps their usefulness with regard to program evaluation processing. For instance, the relatively short duration of coverage associated with the task switch trace program may be preclusive for applications that require more comprehensive analysis. That is, the task switch program may be limited to detecting transition occurrences coincident with its relatively narrow window of operation. As such, the tool may fail to assist the programmer in pinpointing a contentious event in a typical, moderately sized program.

The voluminous nature of the database generated by the task switch trace program further compounds efforts of programmers to efficiently analyze programs. The volume associated with a typical database can be overwhelming and largely superfluous to programmers faced with the meticulous and often tedious task of troubleshooting a program. Consequently, inefficient and problematic portions of a program may remain overlooked. As a related matter, a programmer utilizing a task switch trace program may be unable to employ the program in a dynamic fashion. A user is typically relegated to evaluating the programmatically constructed database only after the task switch trace has populated it in its entirety. As such, the programmer may be unable to view potential bottlenecks and other transition occurrences as they develop. Thus, the programmer is relegated to reconstructing the contentious sequence after viewing the entire database.

Consequently, what is needed is a more efficient and effective manner of analyzing program and system inefficiencies within a multithreaded environment.

SUMMARY OF THE INVENTION

An apparatus, method, and program product consistent with the principles of the present invention are configured to evaluate program performance within a multithreaded system. Distributed, resource oriented storage of diagnostic data facilitates program and system evaluation by focusing debugging applications on contentious processes. Such processes may include threads competing for access to a resource upon which their execution is dependent. Prior to accessing the resource, diagnostic data relating to execution of the thread may accumulate within a data structure. For perspective and other evaluation purposes, the data structure may be correlated to a resource.

Exemplary diagnostic data may include how long the thread actually waits for access to a contentious resource, and may also include program code preceding a locking occurrence. Sources of diagnostic data may further relate to a time measurement, program code of an invocation stack, pointer data, and some combination, thereof. A hash bucket of a hash array may be a suitable data structure for expediting the identification of contentious resources.

In practice, such diagnostic data pertaining to a thread accessing a resource may be accumulated within the data structure. Such accumulation may include subtracting a time corresponding to the occurrence of the lock from a time instance corresponding to the end of the lock to determine how long a thread waits. Program data relating to code executed by the thread prior to the locking occurrence may likewise be stored. Such data may comprise a pointer and/or be retrieved from an invocation stack.

The diagnostic data may ultimately be stored within a specific location in a data structure that is correlated to the resource. The diagnostic data stored in the structure may be displayed to a user such that the data appear relative to the resource. In this manner, the data may be evaluated in the context of a contentious resource that is of particular interest to the user. Where desired, the diagnostic data may be reassigned to other buckets, which may correspond to different resources, so that greater granularity may be achieved in the context of evaluating thread wait time with respect to contentious resources.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above and the detailed description of the embodiments given below, serve to explain the principles of the invention.

DETAILED DESCRIPTION OF SPECIFIC EMBODIMENTS

The scope of the present invention comprises an apparatus, program product and method for evaluating program performance within a multithreaded system. Distributed, resource oriented storage of diagnostic data facilitates program and system evaluation by focusing debugging applications on contentious processes. Such processes may include threads competing for access to a resource upon which their execution is dependent. Prior to accessing the resource, diagnostic data relating to execution of the thread may accumulate within a data structure. Exemplary diagnostic data may include how long the thread actually waits for access to a contentious resource, and/or program code preceding a locking occurrence. The memory block may be correlated to the resource for categorization and evaluation purposes. To this end, the memory block may comprise a hash bucket as described below in detail.

Figure 1:
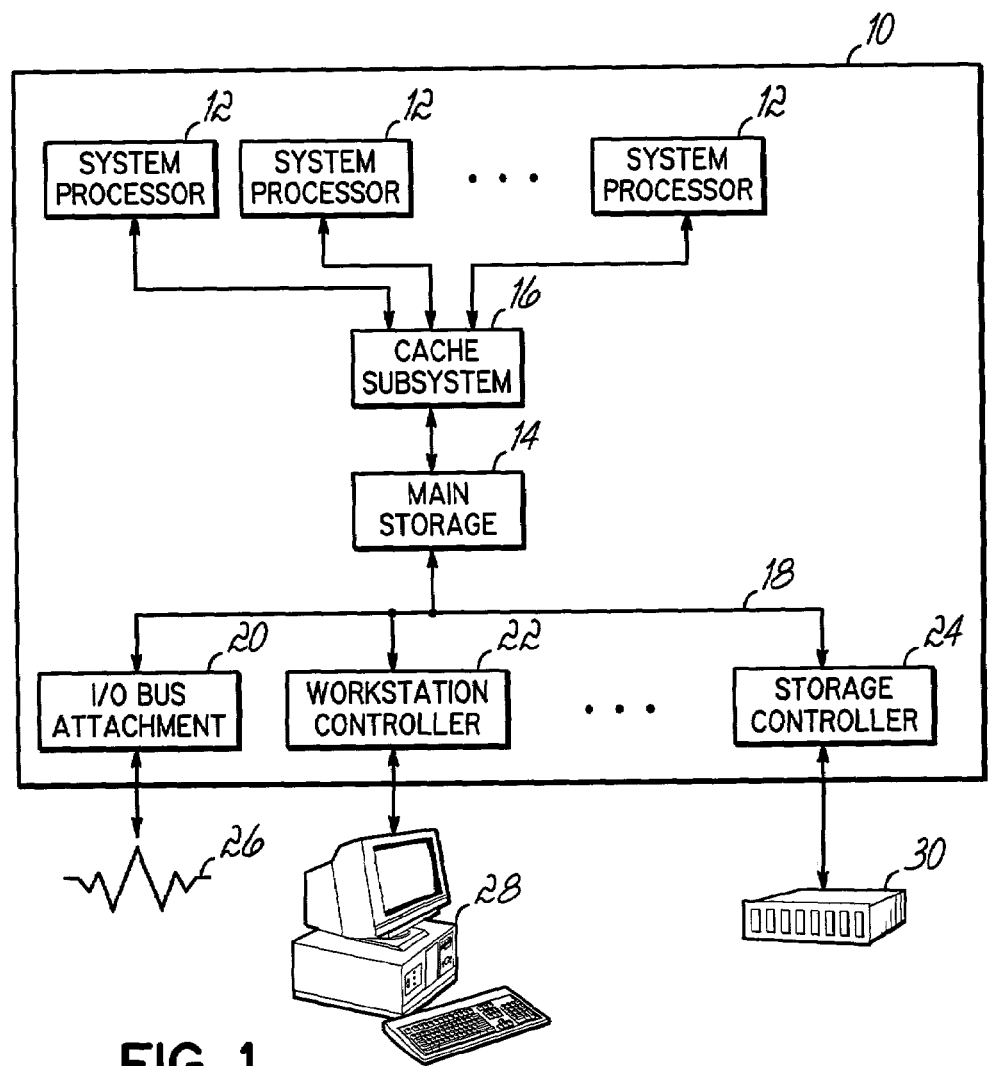
FIG. 1 is a block diagram of a computer consistent with the invention.

Exemplary hardware and software configured to realize such analysis is shown generally in FIG. 1.

Hardware and Software Environment

Turning to the Drawings, wherein like numbers denote like parts throughout the several views, FIG. 1 illustrates a data processing apparatus or computer 10 consistent with the invention. Apparatus 10 generically represents, for example, any of a number of multi-user computer systems such as a network server, a midrange computer, a mainframe computer, etc. However, it should be appreciated that the invention may be implemented in other data processing apparatus, e.g., in stand-alone or single-user computer systems such as workstations, desktop computers, portable computers, and the like, or in other computing devices such as embedded controllers and the like. One suitable implementation of apparatus 10 is in a midrange computer such as the AS/400 or eServer/iSeries computer available from International Business Machines Corporation.

Apparatus 10 generally includes one or more CPU's 12, or processors, coupled to a memory subsystem including main storage 14, e.g., an array of dynamic random access memory (DRAM). Also illustrated as interposed between CPU's 12 and main storage 14 is a cache subsystem 16, typically including one or more levels of data, instruction and/or combination caches, with certain caches either serving individual processors or multiple processors as is well known in the art. The main storage 14 is coupled to a number of types of external (I/O) devices via a system bus 18 and a plurality of interface devices, e.g., an input/output bus attachment interface 20, a workstation controller 22 and a storage controller 24, which respectively provide external access to one or more external networks 26, one or more workstations 28, and/or one or more storage devices such as a direct access storage device (DASD) 30.

Furthermore, it is appreciated that various software components and resources compatible with the apparatus 10 of FIG. 1 and other embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer, and that, when read and executed by one or more processors in the computer, cause that computer to perform the steps necessary to execute steps or elements embodying the various aspects of the invention.

Moreover, while the invention has and hereinafter will be described in the context of fully functioning computers, those skilled in the art will appreciate that the various embodiments of the invention are capable of being distributed as a program product in a variety of forms, and that the invention applies equally regardless of the particular type of signal bearing medium used to actually carry out the distribution. Examples of signal bearing media include but are not limited to storage type media such as volatile and non-volatile memory devices, floppy and other removable disks, hard disk drives, magnetic tape, optical disks (e.g., CD-ROM's, DVD's, etc.), among other storage type media, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Thread Wait Accounting

Figure 2:
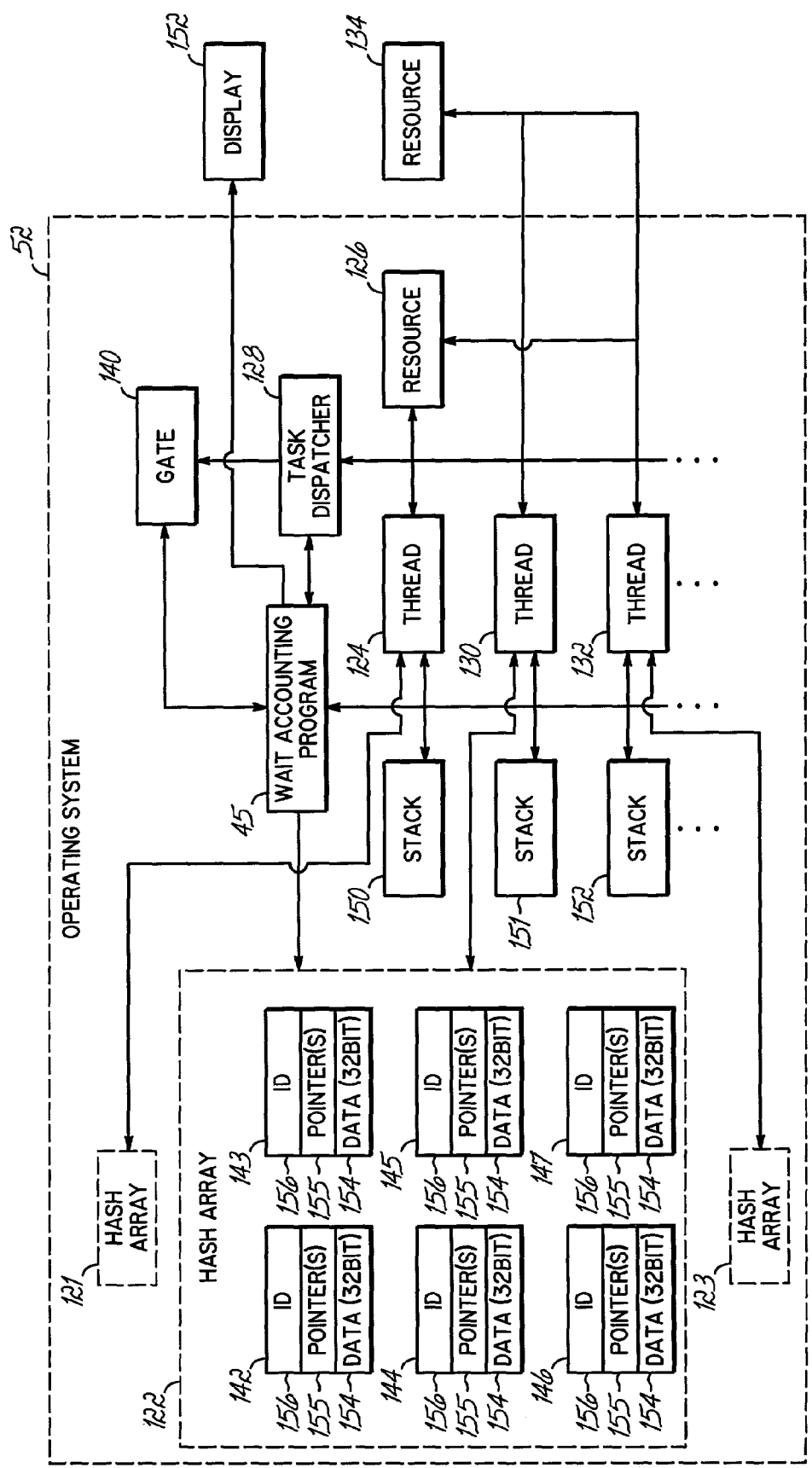
FIG. 2 is a block diagram highlighting key function components of FIG. 1.

FIG. 2 shows a functional block diagram highlighting the primary components suited for implementing thread wait accounting within the hardware and software systems discussed in the text accompanying FIG. 1. As such, the exemplary components facilitate the analysis of program code and system operation within a multithreaded computer system. Within the exemplary operating system 52, program code 45 coordinates and records diagnostic data within storage structures or hash arrays 121–123. The program code 45 initiates data recording in such a manner as the granularity and/or focus of a monitoring process may be dynamically adjusted to track problematic occurrences within the system 52.

Turning more particularly to FIG. 2, a thread 124 attempts to access a required resource 126. For purposes of this disclosure, each thread 124, 130, 132 may represent a single unit or path of execution. As such, each may be characterized as a separately executable portion of a process. A thread may have its own distinct structure that may include storage for pointer information and a program counter. The thread 124 may require access to the resource 126 to continue processing its associated portion of program code. For instance, an exemplary thread may embody a hardware disc I/O arm or database file that the thread must activate or increment before completing its allotted portion of the program.

A desire to access the resource 126 is communicated to a task dispatcher 128 by thread 124 in the form of a request signal. Such a signal may convey information indicative of both the source thread 124 and required resource 126. A task dispatcher 128 may comprise a portion of an operating system 52 that tracks and coordinates thread access to resources 126, 134. As such, a typical task dispatcher 128 may include a chronological listing of thread 124, 130, 132 targeted requests to access resources 126, 134. Other information maintained at the task dispatcher 128 may include pointer fields correlated to the addresses of thread structures 124, 130, 132. As such, the operating system may incrementally move down the task dispatcher list to first locate a thread having an indicated address, then grant it access to the requested resource 126 at an appropriate point of execution.

The task dispatcher 128 may use pointer data to access stored state information maintained within a reactivated thread 124. Such information may include register data reflective of the processing state that the thread was at prior to experiencing a loss of a CPU coincident with a lock. In response to a thread's 124 request, the task dispatcher 128 may query a gate 140 to determine availability of the resource 126. For purposes of FIG. 2, a gate 140 may comprise a programmable structure within the operating system configured to store updated permissions data.

The gate 140 may maintain and update locking permissions that programmatically and effectively block competing threads from gaining simultaneous access to a resource 126. Such provision may be necessary for serialization purposes. Serialization regards a stipulation that only one thread access a given resource at a time. To accomplish this function, the gate 140 may maintain information indicative of which resources were locked by which process, and at what program instance. As discussed in more detail below, program code 45 may capitalize on the independent generation of and access to such data in order to categorize and process its own diagnostic data.

Should the task dispatcher 128 determine that no lock sufficient to prevent the thread 124 from accessing the resource 126 is in place at the gate 140, then the task dispatcher 128 may establish just such a lock at the gate 140 to prevent other threads 130, 132 from accessing the resource 126 while the originating thread 124 does so. Such precautions may serve, in part, to satisfy serialization requirements associated with the operating system 52. Alternatively, should a lock be detected at the gate 140, then the operating system 52 may log the thread's 124 unfulfilled desire to access the resource 126 within the task dispatcher 128. As such, the thread 124 may gain access to the resource 126 after the task dispatcher 128 has sequenced through prior recorded log entries.

Locked as such, the operating system 52 may store the state of the idle thread 124 within the structure of the thread 124 and/or within applicable hardware registers of the operating system 52. Such state information may be stored to facilitate reactivation of the thread at the point where the lock occurred once access to the resource 126 is achieved, and a CPU dispatches to the thread 124. In this manner, the task dispatcher 128 ensures that the locked thread 124 does not have a CPU allocated to it. As such, should the thread 124 be executing on a CPU prior to the lock occurrence, the task dispatcher 128 will reclaim that CPU and reallocate it to a non-idle thread.

As part of its protocol, the program code 45 may initiate storage of the time corresponding to the instant at which the thread's 124 request to access the resource 126 was locked. The time is preferably recorded within the thread 124 structure, but may also be stored within an independent data structure resident in an operating system, such as the hash arrays 121-3 of FIG. 2. The recorded time, as discussed below, facilitates the program code's 45 determination of how long the thread 124 actually waits for access to the resource 126.

The use of hash arrays and associated "hashing" techniques is known to reduce search times associated with many computer applications. A hash array 121-3 consistent with the present embodiment may be supported by a hard drive or other long term storage device. Each thread preferably has its own hash array to record and store data. As shown in the exploded view of hash array 122, a suitable array 121-3 for thread 130 may maintain a number of data records stored within blocks of memory conventionally referred to as buckets 142–147. For purposes of the illustrated embodiment, suitable records may comprise any type of diagnostic data or other programmatic information stored in a format retrievable by an operator or a computer system. Each record is recorded at a particular location having a specific address within the array 122 and bucket 142–147, so that the record may be retrieved from the array in a manner in accordance with program protocol. Any number of records may be included in a typical hash array 122 architecture.

Each bucket 142–147, in turn, may contain some number of entries. The size of each entry may be of a fixed length, for example, a 32 bit storage field 154, and/or a pointer 155 to an address particular to a location embodied in an invocation stack. Each hash bucket 142–147 may be further associated with a identifier 156 obtained by applying a hash function to an item to be stored or retrieved. One skilled in the art will appreciate that the hash function may comprise virtually any operation that can be performed on the item, and preferably is an operation that results in a relatively even distribution of items as between buckets 142–147 of a hash array 122. The hash function may be adjustable to accommodate specific programmer requirements. For example, one such hash function may involve performing successive exclusive-OR operations on diagnostic data and/or resource/thread information. Such an operation may result in, for instance, a 16 bit hash identifier 156 that is capable of uniquely identifying a particular bucket 142.

In addition to recording the time coincident with the lock, an embodiment of the program code 45 may also designate and output a portion or all of an invocation stack 150. Each thread 124, 130, 132, may have a corresponding invocation stack 150, 151, 152, respectively, comprising a chronological accumulation of code executed by each thread 124, 130, 132. The program code 45 may acquire pointers to the stored content of an invocation stack 150 prior to the occurrence of a lock in order to decipher a cause of the same. The amount of code retrieved from the invocation stack 150 by the program code 45 may be set by a programmer according to diagnostic requirements. Such a chronology of code leading up to a lock may reveal insights as to why a thread has been locked and/or how a process can be made more efficient. To this end, the program code 45 may further initiate the storage of the actual code, or pointers to the invocation stack 150 within the array 121-3, or even the structure of the thread 124, itself.

Should the lock present at the gate 140 and blocking the thread's 124 access to the resource 126 be lifted, then the thread 124 may have its state restored by the operating system 52. Namely, the task dispatcher 128 may assign a CPU or timeslice to the thread 124 in accordance with hardware registers updated to reflect the current operating status of the thread 124. Coincident with the CPU being reunited with the thread 124, the program code 45 may initiate processes designed to ascertain what type or specific resource 126 is associated with the lock.

More particularly, the program code 45 may scan the contents of the gate 140 to register the resource 126 for which the thread 124 waits. Recognizing the type of resource associated with a locking occurrence can prove extremely valuable to a debugging operation. For example, such information can focus a user's attention on a potentially problematic area. Such a scenario may arise where an inordinate number of threads lock on a single resource. To this end, the type of resource 126 determined by the program code 45 may be correlated to a bucket 144 of the hash array 122. Buckets 142–147 of the array 122 may comprise storage space that is configured so as to be readily hashed, or searched according to an identifier 156 correlated to the resource. Each hash array 121-3 preferably provides for around 150 such buckets.

As discussed above, each bucket 142–147 may include a unique identifier 156 that may be used to categorize and retrieve diagnostic data according to a type of or specific resource. For example, a bucket 146 used in the above discussed telecommunication example may contain an identifier 156 correlated to a communications box. The communications box may contain a file that must be incremented whenever a data packet is transmitted. Such a monotonic regiment may ensure that packet data is reassembled correctly down the communications network. Thus, it is imperative that only one thread access the file at a time to prevent two threads from simultaneously assigning an identical routing number to two packets, corrupting transmission sequences. Subsequently, serialization safeguards may cause many threads to wait for sole access to the box, increasing the occurrence of contentious processes associated with such resources. Consequently, the program may assign unique or common identifiers 56 to resource types listed at the gate 140 and known to be communication boxes.

The identifier 56 may be used to assign and dynamically reassign or redistribute resource(s) 126, 124 to applicable bucket(s) 142–147. As discussed below, flexibility afforded by such a bucket configuration enables a programmer to specify and focus an evaluation process by isolating information pertinent to contentious processes within a single or small grouping of buckets 142–147. Program code 45 may additionally record pointers 155 designating the address of the applicable thread 124. The structure of such an embodiment may enable a programmer to access resource and/or thread specific data via a display 152 of the bucket information discussed below. In this manner, a programmer may retrieve pointers 155 to the invocation stack as well as other information stored within the structure of the thread 124.

Of note, some evaluation applications may not require reference to the invocation stack 150. As such, another embodiment of the invention may disregard stack information in favor of other diagnostic data, such as wait time data discussed below. Still another application consistent with the principles of the present invention may allow retrieval of stack 150 information on a thread-by-thread basis. In this manner, the programmatic retrieval of stack code will only be initiated where a programmer designates a group of or particular thread. Such selective retrieval further enhances the relatively concise nature of the output scheme of the current embodiment.

Though the flexible format of the bucket scheme accommodates storage of virtually any form of diagnostic data, a preferred parameter comprises a time increment corresponding to how long a thread 124 waits for a resource 126. To this end, the program code 45 may initiate calculation of the total time the thread 124 waits for access to the resource 126. Namely, the program code 45 may record the time instance corresponding to an instant that the thread 124 actually accessed the resource 126. From this time instance, the program code 45 subtracts the earlier recorded time corresponding to when the thread 124 was initially locked. The program code 45 may initiate storage of the resultant time increment within a bucket 144 appropriate to the resource 126 and associated identifier 156.

Of note, though a time increment specific to the thread 124 may be separately retrievable via the bucket interface, a programmer preferably configures a bucket 144 to display an aggregate time reflective of the time all threads 124, 130, 132 spent waiting for the resource 126. Such an aggregate number may be displayed to a user at block 152. Of note, the display 152 may be updated by the program code 45 as the threads 124, 130, 132 actually execute. In this manner, the program code 45 enables dynamic review of a system's 52 operation. Thus, a programmer is not relegated to waiting for the conclusion of a program iteration to evaluate program code. Rather, the programmer may monitor a system and its associated resources as problems develop. This perspective may result in the programmer gleaning insights associated with dynamics relating to the order or sequence of program execution.

The bucket display 152 may be configured to present diagnostic data according to resource 126, 134 usage. That is, information within each bucket may embody diagnostic data particular to a type of or single resource 126, 134. As discussed herein, exemplary diagnostic data may at least include time increment information. At a glance, the programmer may digest which bucket 142–147 and corresponding resource(s) 126, 134 are prone to inordinate system blockage. As such, analysis and review of the buckets 142–147 may reveal a resource or thread sequence of particular interest. Such information may allow a programmer to better focus their debugging efforts on problematic system and/or programming areas.

Should still greater clarity be desired, the program code 45 enables a user to redistribute bucket 142–147 assignments to accommodate greater granularity. For instance, identifiers 156 associated with the buckets 142–147 may be reassigned with respect to resources 126, 134 in order to isolate a resource 126 of particular interest to the programmer. For instance, reshuffled identifiers 56 may be correlated to different resources 126, 134 included within the gate 140 and as designated by the programmer. A newly correlated resource 126 may then be assigned to a different bucket 145 so as to readily distinguish its associated wait times/time increment from other resources 134.

For example, a first run of a program may reveal that a bucket 144 corresponding to three different types of resources has an aggregate wait time of 150 seconds. To discern which of the three resources accounts for the largest share of the delay, each resource may be assigned its own bucket. A subsequent run of the program may reveal that most or all of the delay is attributable to just one of the resources, perhaps a database file having an excessively long path name. Thus identified, the programmer may take steps to minimize wait time associated with the file.

In terms of FIG. 2, an initial application may distribute resources 126, 134 pertinent to thread 130 uniformly among buckets 142–147. As such, a programmer may quickly glance at the displayed buckets 142–147 to discern those resources 126, 134 that may be affiliated with unacceptable levels of blockage. From there, the program may accommodate a user reallocating resources 126, 134 to different buckets 142–147 to achieve a more focused and revealing perspective. As discussed above, the program code 45 may additionally accommodate a display of invocation stack 150 data for the particular process. A pointer 155 within the bucket 144 and/or within the thread 124 structure, itself, may point to lines of code within the invocation stack 150 preceding the lock occurrence. This feature may further facilitate analysis of process execution.

Of note, the above illustrated embodiment may be used in conjunction with conventional debugging mechanisms to augment analysis. For instance, a programmer may run a task switch trace program with regard to a thread that has been identified as problematic using the present invention. Thus, the present invention is compatible and compliments known prior art systems and methods.

Figure 3:
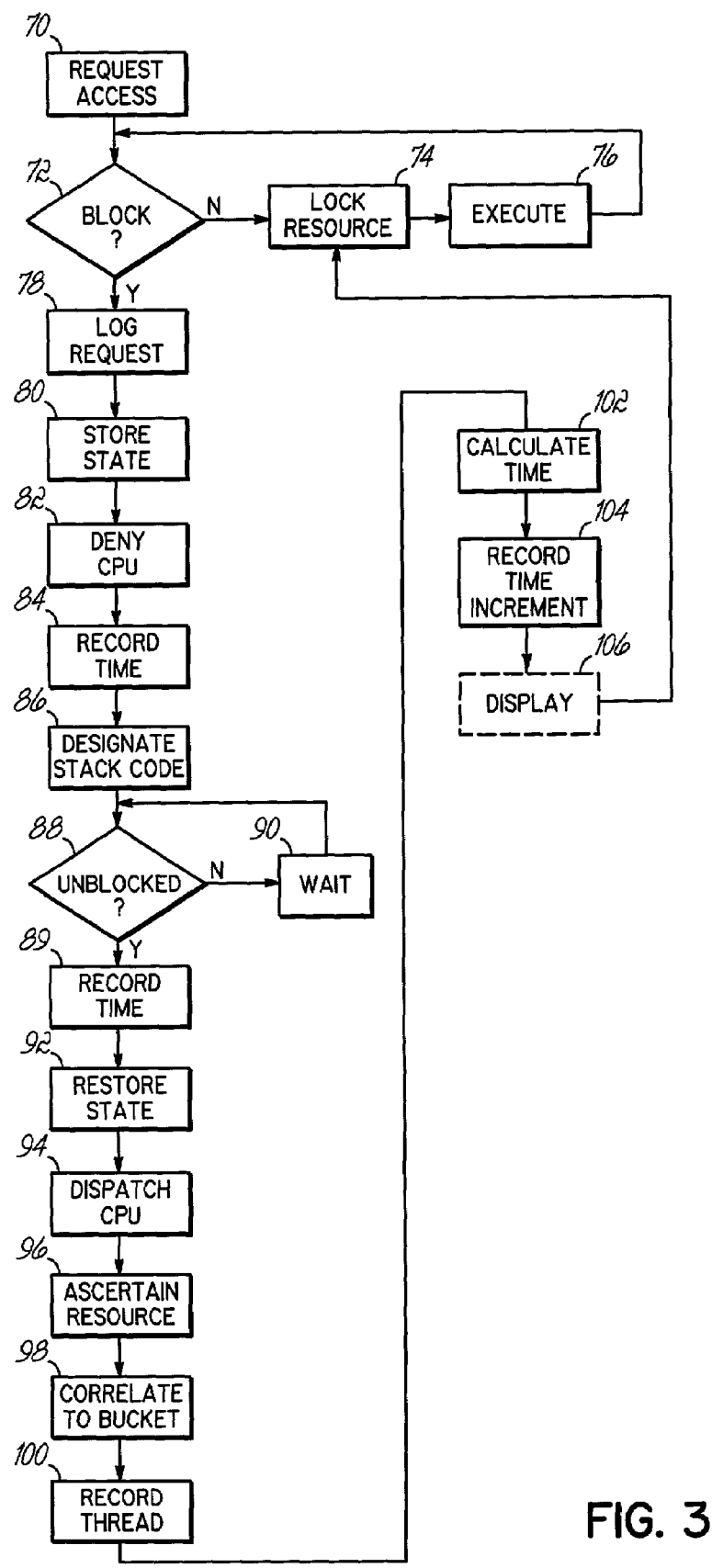
FIG. 3 is a flowchart having sequenced steps suited for execution using the hardware and software components of FIGS. 1 and 2.

The flowchart of FIG. 3 comprises exemplary method steps suited for execution within the hardware and software systems of FIGS. 1 and 2. Generally, the sequenced steps facilitate the evaluation of program execution through the use of dynamically accessible and interactive data processes. Distributed, resource oriented storage of diagnostic data facilitates program and system evaluation by focusing debugging applications on contentious processes.

Turning more particularly to the flowchart, a thread attempts to access a required resource at block 70. Suitable resources may include any process or device, such as an I/O disk, or database file that the thread needs in order to accomplish its task. At block 72, the task dispatcher of the operating system may assess whether the petitioning thread can be granted access to the requested resource. The task dispatcher may function to coordinate thread access to shared resources, such as storage.

In order to make its determination at block 72, the dispatcher may query a gate of the operating system to see if a programmatic lock is current and applicable to the resource. As discussed herein, a suitable gate is a logical, programmable structure associated with access permissions relating to system resources. The operating system may utilize the gate as a mechanism to ensure serialization; that is, the practice of allowing only one thread access to a resource at a given program instance.

Should the gate indicate that no lock is present on the resource at block 72, then the operating system confirms that the resource is available for the petitioning thread. Accordingly, the dispatcher may activate a respective lock at the gate to ensure that only the petitioning thread has access to the resource at block 74. Should the thread lack a CPU or timeslice at block 76, then the operating system may immediately dispatch one to the thread for execution. The thread will then process code until another lock is encountered at block 72.

Conversely, should the presence of an active lock be detected at block 72, then the resource is rendered unavailable to the accessing thread. As discussed above, examples of locks can include time locks, gate locks, and yielding operations. The operating system may register the thread's requirement with the task dispatcher at block 78. This registration places the thread in line to receive a CPU or timeslice from the dispatcher when the lock condition of block 72 is removed. The state of the thread is stored within hardware registers at block 80 in preparation for this event. That is, instructions and status information relating to the thread are preferably stored within registers of the operating system and/or thread structure, itself. Such provision enables the thread to later resume execution at the instant where its processing was interrupted at block 72.

Because thread execution is locked, the operating system may ensure that no CPU or timeslice is allocated to the thread while it is idle at block 82. In this manner, the processing resource is liberated and available for another thread that is not similarly locked. To this end, the time that the thread encounters the lock may be recorded by the wait accounting program of the embodiment at block 84. Program code may store the recorded time within the structure of the thread for later use.

Where desired, the program may further initiate the location of pertinent code within the invocation stack at block 86. Each thread may have a corresponding invocation stack comprising a historical accounting of different code pieces called prior to the occurrence of a lock. The accounting may implicate pointers and other instructional information configured to inform the operating system of where to send the thread so it can resume execution at an operating stage corresponding to where it left off. The thread structure, itself, may contain a pointer to the invocation stack. As such, program code associated with the present invention may access the thread structure to determine and record pointers to regarding the invocation stack.

The number of code lines indicated by the pointer address may correspond to a predetermined number of operations occurring prior to the lock encounter. Such code may reveal information critical to a programmer's analysis of why the thread was and remained locked. Pointers to the invocation stack may be stored within the thread structure as discussed above, or alternatively within a block of storage, such as a bucket. Of note, another embodiment may not concern itself with invocation stack information, altogether. Such an application may limit its analysis parameters to wait time increments and other diagnostic data for processing and brevity considerations.

The thread may continue to wait or spin at block 90 until its required resource becomes available at block 88. At block 89, the program code may initiate capture and storage of a time instance coincident with the release of the lock that blocked access to the resource. As above, the time instance may be recorded within the structure of the thread and/or hash bucket. In further response to the resource becoming unlocked, the state of the thread may be restored at block 92. That is, the registers of the thread may direct the operating system to recommence execution of the thread where it was interrupted by the lock. Accordingly, the operating system reunites the thread with a CPU at block 94.

Program code executed by the operating system determines the nature of the resource at block 96. That is, the wait accounting program accesses the gate to read and ascertain the type of resource for which the thread was waiting. The determined type of resource may be correlated to a hash bucket at block 98. For purposes of the illustrated embodiment, a bucket may be any storage entity, the contents of which is readily recalled and evaluated. Buckets may be configured according to arrays and individual identifiers as dictated by program protocol. Each identifier preferably corresponds to a type of resource upon which a programmer wishes to focus an evaluation. The identifier correlated to both the resource and bucket(s) may be used by the program to match the resource determined at block 96 to a particular bucket at block 98. In this manner, information pertaining to the resource may be stored and recalled within the bucket according to the identifier.

Similarly, information regarding the thread may be obtained from the gate at block 100. More particularly, a pointer addressing the accessing thread may be recorded in the same or another bucket. Of note, some applications may not require the accumulation of thread data. Another programmer's preference may stipulate that such information only be obtained manually by evaluating a short program code compilation, as opposed to automatically recording such information. At block 102, the program calculates the total time for which the thread waited for the resource to become available. More particularly, the program subtracts the time recorded at block 84 from the time instance of when the lock was lifted at block 89.

The resultant time increment may then be stored in a hash bucket at block 104 that preferably, but not necessarily, corresponds to the resource. Of note, similar increments may be accumulated within the bucket for multiple threads. As such, an operator may optionally elect to view results regarding the diagnostic data in real time at block 106. Though each thread's contribution may be individually trackable via the gate and associated pointers, a total time increment for a resource/bucket displayed at block 106 may reflect an aggregate wait time for the resource. Such a display may quickly bring to the attention of a programmer a type or specific resource associated with disproportionate delays in thread waiting time. As discussed herein, such information may facilitate the targeting of potential programming and/or hardware problems within a system.

Whether or not the operator utilizes the display feature at block 106, the task dispatcher may lock the resource at block 74 for the exclusive use of the accessing thread. More particularly, the task dispatcher may update the gate in recognition of the resource becoming unblocked at block 88 to ensure exclusive access for the thread. Such a precaution may satisfy serialization and other programmatic requirements that ultimately facilitate thread execution at block 76.

Figure 4:
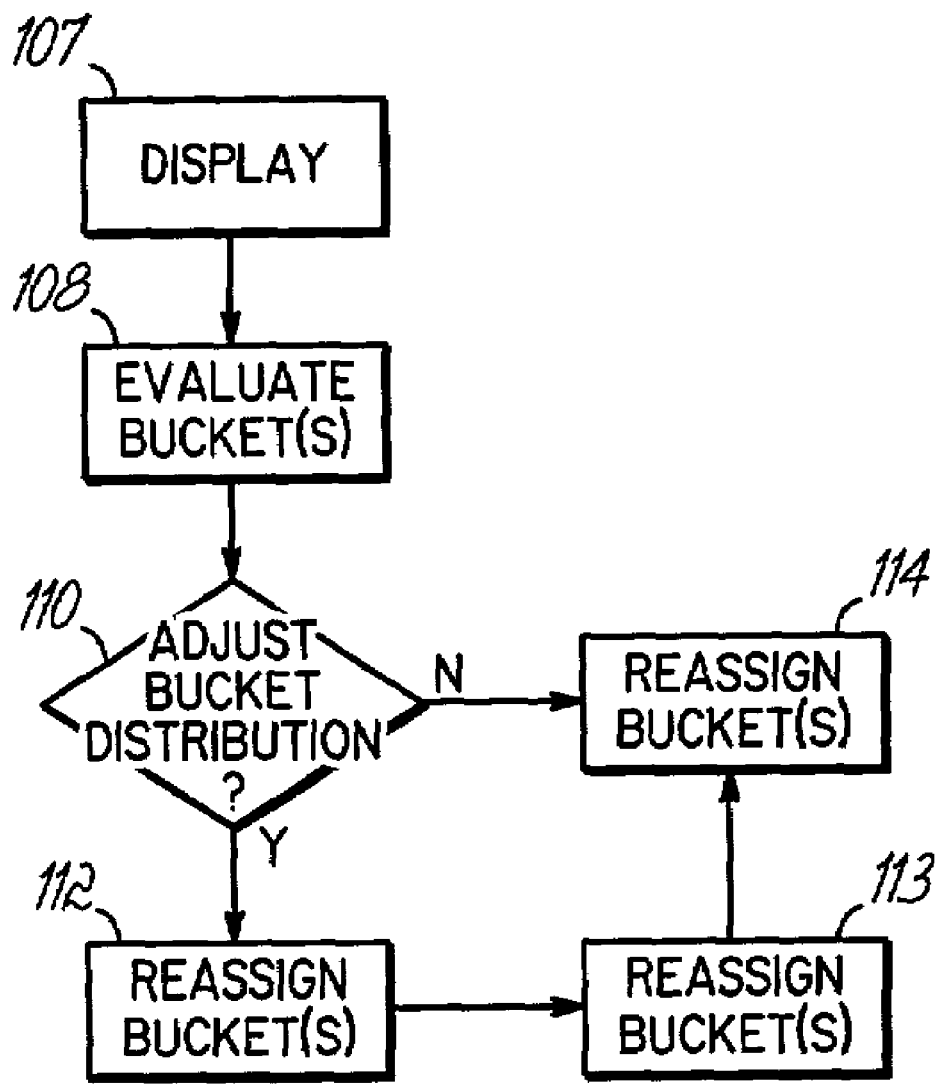
FIG. 4 is a flowchart having exemplary steps suited to display diagnostic data processed in the flowchart of FIG. 3.

The flowchart of FIG. 4 shows process steps suited for evaluating program and/or system performance with regard to the hardware and software configurations of FIGS. 1 and 2. The exemplary steps enable an operator to view and analyze system processes in a manner that expedites the identification of contentious resources. As such, the program code of the embodiment may initiate a display at block 107 of bucket contents. Significantly, each bucket may be correlated to one or more resources. That is, the bucket may share a common or correlated hash key and/or other programmatic identifier with a resource. The identifier may thus constitute an associative relationship between bucket and resource that the program code may exploit in order to structure and display diagnostic data with respect to the resource.

The diagnostic data comprising bucket contents that is displayed at block 106 preferably includes a total time increment that communicates an aggregate wait time particular to a contentious resource. Such a display may be configured to quickly draw attention to resources associated with disproportionate thread waiting time. As discussed herein, such information may facilitate the targeting of potential programming and/or hardware problems within a system. Should such perspective be desirable, each thread's individual contribution to that time increment may remain individually trackable via the gate and associated pointers. The operating system and executed program code thus enables a programmer to evaluate the buckets at block 108.

Should still more focus be desired by the programmer at block 110, the program may allow for the redistribution of buckets among arrays. For instance, a programmer may perceive that a grouping of resources that includes disk I/O hardware components, among other resources, has 150 seconds of associated thread waiting time. Such an increment may be sufficient in duration to give alarm to a network administrator. To this end, a programmer may desire to see what percentage of that aggregate time is attributable solely to the disk hardware components. Thus, the bucket identifiers may be manipulated so as to have a single bucket corresponding to only disk hardware components. In this manner, the programmer can readily observe the amount of wait time affiliated with this single type of resource.

Functionally, a new identifier may be assigned to the specified resource type (disk I/O component) and newly correlated bucket at block 98 according to the programmer request at block 112. Significantly, the program code may initiate a display the information requested by the programmer as the thread and/or program executes. Thus, the programmer need not wait for the entire program sequence to end before evaluating program code. This feature may enable a programmer to dynamically evaluate the program in the context of its temporal execution relative to other functions. Such information may ultimately assist the programmer in discovering bottlenecks and other areas where efficiencies could be implemented.

Where desired, the wait accounting program may produce data from the invocation stack relative to a thread or resource at block 114. Such data may be stored within the stack and is preferably accessed through pointer information recorded and accessible via the bucket and/or thread structure. As with all steps of the flowchart of FIG. 4, such evaluation of data may further reveal areas of potential improvement and significantly and may be utilized while the program and/or system is running. That is, the sequenced steps of FIG. 4 may be implemented via a debugger user interface, for example, with or without halting execution of the program.

Of note, the bucket configuration of the above discussed embodiment does not require nearly as much memory capacity and/or processing power for data collection and analysis as prior art evaluation systems that populate extensive databases with exhaustive, historical data. Efficiencies associated with the smaller volume and decentralized storage of diagnostic data associated with the wait accounting program code 45 may allow it to run on a system at all times. Comparable run times for conventional evaluation programs would be impractical as applied as such because their output would quickly overwhelm most systems. Such continuous monitoring can translate into more pointed diagnostic data over longer periods of time.

The low overhead associated with the program code enables multiple collections of statistical data and subsequent evaluation. This feature allows programmers and/or system administrators to evaluate network performance in the context of past performance. Such perspective may accommodate comparative procedures that can help pinpoint a system complication based on prior applications. Another benefit afforded by the present invention relates to its well-distributed memory utilization. Bucket assignments may be varied to hone-in on contentious program scenarios.

This feature further facilitates real time evaluation by the wait accounting program by allowing programmers to dynamically monitor potential bottlenecks and other problems. Furthermore, processes associated with the present invention are compatible with known prior art debugging methods.

While the present invention has been illustrated by a description of various embodiments and while these embodiments have been described in considerable detail, it is not the intention of the applicants to restrict, or in any way limit, the scope of the appended claims to such detail. For instance, all or part of the coordination of yielding threads in another embodiment may be conducted within individual operating systems or partitions, as opposed to at the hypervisor level. As such, all threads may yield to the hypervisor simultaneously.

Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of analyzing program execution within an operating system of a multithreaded environment, comprising:
   accumulating diagnostic data pertaining to a thread accessing a resource, the execution of a thread being predicated upon the thread's access to the resource within the multithreaded environment; and
   storing the diagnostic data within a data structure at a location in the data structure correlated to the resource;
   detecting a locking occurrence associated with the thread;
   calculating a time increment corresponding to a duration that the thread remains locked; and
   using the time increment to analyze the program execution.

2. The method according to claim 1, wherein the diagnostic data includes data selected from at least one of: a time measurement, program code executed by the thread, an invocation stack, and pointer data.

3. The method according to claim 1, wherein the data structure comprises a hash bucket.

4. The method according to claim 1, further comprising determining the resource.

5. The method according to claim 4, wherein determining the resource includes reading contents of a task dispatcher.

6. The method according to claim 1, further comprising storing information identifying the resource.

7. The method according to claim 1, further comprising matching an identifier corresponding to the resource to a correlative identifier corresponding to the data structure.

8. The method according to claim 7, further comprising reassigning the identifier to a second resource.

9. The method according to claim 7, further comprising assigning the correlative identifier to the data structure.

10. The method according to claim 1, further comprising storing the time increment within the data structure.

11. The method according to claim 1, further comprising recording the time corresponding to the locking occurrence.

12. The method according to claim 1, further comprising detecting a removal of the locking occurrence.

13. The method according to claim 12, further comprising recording a time instance corresponding to the removal of the locking occurrence.

14. The method according to claim 1, further comprising recording program data relating to code executed by the thread prior to the locking occurrence.

15. The method according to claim 14, further comprising retrieving the program data from an invocation stack.

16. The method according to claim 1, further comprising displaying the diagnostic data.

17. A method of analyzing program execution within a computer system having a plurality of threads accessing a plurality of resources, comprising:
 detecting a locking occurrence associated with a thread of the plurality of threads;
 calculating a time increment reflective of a duration the thread waits for access to a resource of the plurality of resources, the execution of the thread being predicated upon the thread's access to the resource;
 storing the time increment within a hash bucket of a plurality of hash buckets comprising a hash array, each hash bucket being correlated to the resource; and
 using the time increment to analyze the program execution.

18. The method according to claim 17, further comprising reallocating the plurality of resources to the plurality of hash buckets to group the diagnostic data with a different scheme.

19. An apparatus comprising:
 at least one processor configured to execute a plurality of threads;
 a memory; and
 program code resident in the memory and configured to execute on the at least one processor, the program code configured to accumulate diagnostic data pertaining to a thread accessing a resource, the execution of a thread being predicated upon the thread's access to the resource, to store the diagnostic data within a data structure at a location in the data structure correlated to the resource, wherein the program code initiates a detection of a locking occurrence associated with the thread and calculates a time increment corresponding to a duration that the thread remains locked, and facilitates use of the time increment to analyze the program execution.

20. The apparatus according to claim 19, wherein the diagnostic data includes data selected from a group consisting of at least one of: a time measurement, program code executed by the thread, an invocation stack and pointer data.

21. The apparatus according to claim 19, wherein the data structure comprises a hash bucket.

22. The apparatus according to claim 19, wherein the program code initiates a determination of the resource.

23. The apparatus according to claim 19, wherein the program code initiates storing information identifying the resource.

24. The apparatus according to claim 19, further comprising matching an identifier corresponding to the resource to a correlative identifier corresponding to the data structure.

25. The apparatus according to claim 24, wherein the program code initiates reassigning the identifier to a second resource.

26. The apparatus according to claim 24, wherein the program code initiates assigning the correlative identifier to the data structure.

27. The apparatus according to claim 19, wherein the program code initiates storing the time increment within the data structure.

28. The apparatus according to claim 19, wherein the program code initiates recording a time corresponding to the locking occurrence.

29. The apparatus according to claim 19, wherein the program code initiates detecting a removal of the locking occurrence.

30. The apparatus according to claim 29, wherein the program code initiates recording a time instance corresponding to the removal of the locking occurrence.

31. The apparatus according to claim 19, wherein the program code initiates recording program data relating to code executed by the thread prior to the locking occurrence.

32. The apparatus according to claim 31, wherein the program code initiates retrieval of the program data from an invocation stack.

33. The apparatus according to claim 19, wherein the program code initiates a display of the diagnostic data.

34. A program product, stored in a computer storage media, said program product comprising:
 program code executable by a computer for analyzing program execution within an operating system of a multithreaded environment, wherein the program code is configured to accumulate diagnostic data pertaining to a thread accessing a resource, the execution of a thread being predicated upon the thread's access to the resource, and to store the diagnostic data within a block of the memory correlated to the resource, wherein the program code initiates a detection of a locking occurrence associated with the thread and calculates a time increment corresponding to a duration that the thread remains locked, and facilitates use of the time increment to analyze the program execution.

* * * * *